United States Patent [19]
Garcia

[11] Patent Number: 5,957,173
[45] Date of Patent: Sep. 28, 1999

[54] PLANER WITH POSITIVELY LOCKING CUTTERHEAD

[75] Inventor: Jaime E. Garcia, Wexford, Pa.

[73] Assignee: Delta International Machinery Corp., Pittsburgh, Pa.

[21] Appl. No.: 09/060,905

[22] Filed: Apr. 15, 1998

[51] Int. Cl.[6] .................................................. B27C 1/02
[52] U.S. Cl. ........................................ 144/117.1; 144/130
[58] Field of Search .............................. 403/109.1, 109.3, 403/110, 202, 234, 300, 326, 330, 374.5, 377; 144/114.1, 116, 117.1, 129, 130

[56] References Cited

U.S. PATENT DOCUMENTS

| | | |
|---|---|---|
| 1,802,096 | 4/1931 | Tautz . |
| 2,577,975 | 12/1951 | Moore . |
| 2,780,251 | 2/1957 | Williams . |
| 2,873,776 | 2/1959 | Buttke . |
| 4,118,141 | 10/1978 | Spohn . |
| 4,436,126 | 3/1984 | Lawson . |
| 4,440,204 | 4/1984 | Bartlett . |
| 5,174,348 | 12/1992 | Miyamoto et al. . |
| 5,771,949 | 6/1998 | Welsh et al. ........................... 144/117.1 |
| 5,794,675 | 8/1998 | Garcia ................................... 144/117.1 |
| 5,816,303 | 10/1998 | Shadeck ................................ 144/117.1 |
| 5,829,499 | 11/1998 | Liao ...................................... 144/117.1 |

FOREIGN PATENT DOCUMENTS

| | | |
|---|---|---|
| 2182153 | 1/1997 | Canada . |
| 0 755 759 A2 | 1/1997 | European Pat. Off. . |
| 298573 | 9/1984 | Taiwan . |

OTHER PUBLICATIONS

Holland and Kinter, "Thickness Planer Primer", *Fine Woodworking*, pp. 58–63 (May/Jun. 1988, No. 70).
Instruction Manual, Delta International Machinery Model No. 22–540 12" Portable Planer (Aug. 20, 1993).
Parts Listing, Delta International Machinery Model No. 22–540 12" Portable Planer (Oct. 23, 1992).
Instruction Manual, Delta International Machinery Model Nos. 22–660, 22–661, and 22–671 DC–33 13"×5.9" Planer (Apr. 20, 1991).
Parts Listing, Delta International Machinery Model DC–33 13"×5.9" Planer (Nov. 30, 1990).
Instructional Manual, Delta International Machinery Model No. RC–51 20" Planer (Jan. 20, 1992).
Instructional Manual, Delta International Machinery Model Nos. RC–63D and RC–63N 24" Planer (Nov. 8, 1991).
Sloan, "Small Thickness Planers", *Fine Woodworking*, pp. 72–78 (May/Jun. 1985).
McCafferty, "The Workbench Guide to Planers", *Workbench*, pp. 34–37 (Jan./Feb. 1990).
Nagyszalanczy, "Portable Planer Survey", *Fine Woodworking* pp. 46–51 (Sep./Oct. 1990).
Krier, "Thickness Planers Under $500: Plenty of Power in a Pint–Sized Package", *Wood Magazine*, pp. 64–67 (Apr. 1990).

*Primary Examiner*—W. Donald Bray
*Attorney, Agent, or Firm*—Kirkpatrick & Lockhart LLP

[57] ABSTRACT

A locking apparatus for selectively locking a driven cutterhead at a desired elevation relative to a support surface of a planing apparatus having a frame assembly for supporting the cutterhead relative to the support surface. The locking apparatus includes at least one locking plate having a first and second sides attached to the frame assembly. The locking apparatus also includes a first clamping block attached to the cutterhead and disposed adjacent to the first side of the locking plate and a second clamping block disposed adjacent to the second side of the locking plate. Additionally, the locking apparatus includes means attached to the first and second clamping blocks for selectively drawing the first and second clamping blocks into clamping engagement with the locking plate to lock the cutterhead at a desired elevation.

14 Claims, 7 Drawing Sheets

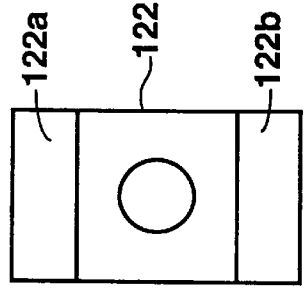
FIG. 5a
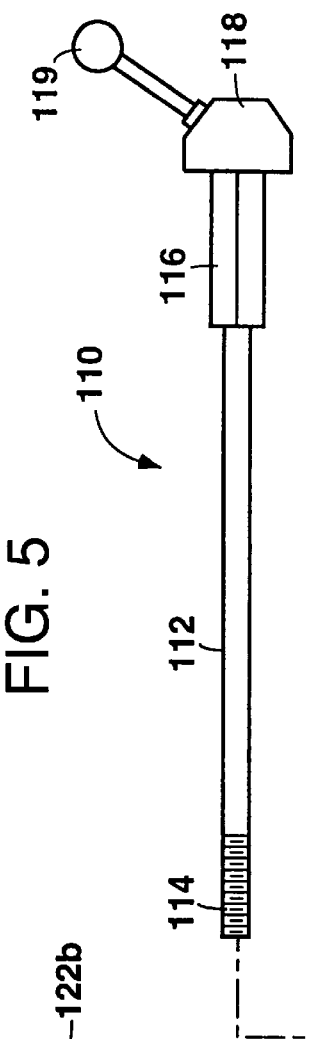
FIG. 5
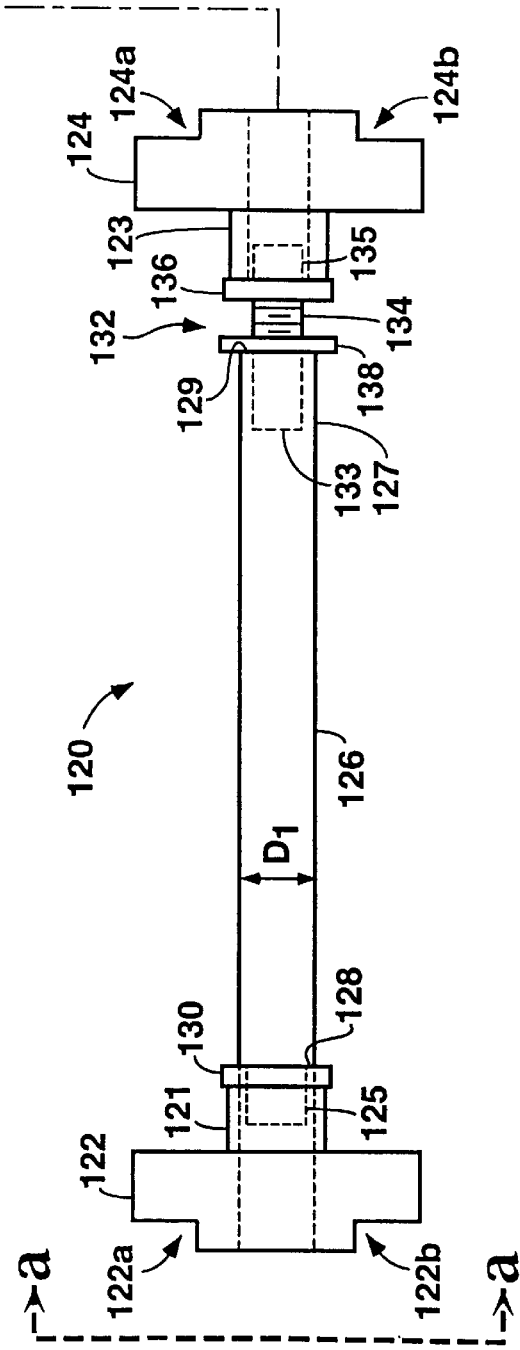

PLANER WITH POSITIVELY LOCKING CUTTERHEAD

BACKGROUND OF THE INVENTION

1. Field of the Invention

The present invention relates to an apparatus for reducing the thickness of a piece of material, and, more particularly, is directed to a portable apparatus for planing wood.

2. Description of the Invention Background

Generally, a planer is used to finish a piece of lumber, i.e., to uniformly reduce the thickness of the lumber while achieving a smooth, flat surface. The basic components of a typical planer are a table, a cutterhead, infeed and outfeed rollers, and a motor. The table levels and supports the workpiece as the workpiece is fed into the planer and is passed under the rapidly rotating cutterhead. The cutterhead includes two or more knives secured within its cylindrical head which cut away thin slivers of wood as the workpiece is passed beneath it. The powered infeed and outfeed rollers grip and support the workpiece as they advance and pull the workpiece through the cutterhead. These rollers are typically spring mounted so that the pressure exerted by the rollers on the workpiece can be adjusted to ensure the rollers properly engage and guide the workpiece through the planer. The motor drives the cutterhead and the powered rollers.

Typical portable planers have only one cutterhead located above the planer table. Thus, both sides of the board must be passed through the planer to attain the desired finished surface. Additionally, several passes through the planer may be required to remove the desired amount of wood from the workpiece. For instance, portable planers, due to their size and weight, cannot remove more than $\frac{1}{32}$ of an inch of stock in one pass for a finished cut and can remove about a maximum of $\frac{3}{32}$ of an inch on a preliminary cut. Thus, several passes through the planer may be required to achieve a desired thickness of the workpiece. The depth of cut adjustments are made by lowering the cutterhead towards the workpiece or by raising the table, and thus the workpiece, towards the cutterhead.

Prior planers, particularly portable planers, cause damage to each end of the workpiece. In particular, when the workpiece is fed into the planer, it is initially only supported by the powered, spring mounted infeed roller. When the workpiece contacts the cutterhead, it is thrust against the cutterhead which causes the cutterhead to jump. This jumping action results in indentations or "snipes" being formed in at least the first few inches of the workpiece. The sniping discontinues when the workpiece is advanced further into the planer and is supported by both the infeed and outfeed roller. The support by both rollers prevents the workpiece from being thrust against the cutterhead. Similarly, as the workpiece exits the planer, and is supported only by the outfeed roller, the workpiece is again thrust against the cutterhead, causing it to jump. This jumping action again results in snipes being formed in the last few inches of the workpiece. Therefore, current planers cause damage to both the first and the last few inches of each end of a workpiece, which are therefore not useable as finished stock.

Thus, there is a need for a planar that can uniformly reduce the thickness of a workpiece without causing damage to each end of the workpiece.

There is a further need for a planer that is relatively lightweight and a portable.

There is yet another need for a planer with the above-mentioned attributes that is relatively inexpensive to manufacture.

SUMMARY OF THE INVENTION

In accordance with the present invention, there is provided a planer apparatus having a frame member that supports and mounts at least one column member. The frame member includes a top portion and a bottom portion. A head, which includes a cutterhead for removing slivers of wood from a workpiece, is slidably engaged on the column member between the top and bottom portions of the frame member. The head member has two side portions. A locking plate, mounted within the bottom portion of the frame member, extends to the top portion of the frame member such that the locking plate is adjacent to the side portions of the head member. A locking assembly mounted on the head member tightens the side portions of the head member and the locking plates together such that when the locking assembly is tightened, the head member is maintained at a particular vertical position along the column member.

In a preferred embodiment, four column members are mounted between the top and bottom portions of the frame member and two locking plates are mounted on either side of the bottom portion of the frame member. The locking plates are made from steel and are substantially U-shaped such that each side of the locking plates forms a fork. The locking assembly extends between the forks of the locking plates. The locking assembly includes a rod assembly and a locking bar assembly. The rod assembly includes a rod having threads on one end and a hub on the other end and the rod assembly is received within the locking bar assembly. The hub of the rod assembly includes a lever which is used to rotate the rod assembly within the locking bar assembly. The locking bar assembly includes a shoe on each end and a tube extending between the shoes. The locking bar assembly extends between the locking plates such that the shoes of the locking bar assembly abut the forks of the locking plates. The shoes include indentations that are sized and shaped to correspond to the size and shape of the forks of the locking plates.

The locking bar assembly may further include spacers mounted between the ends of the tube and each shoe. One side of the tube is threaded on its inside and the spacer mounted between the shoe and the tube on the threaded side includes a screw and a lock nut. The screw has threads corresponding to the threads on the inside of the tube such that when the screw is threadably engaged with the tube, the distance between the shoes can be extended such that the shoes abut the forks of the locking plate.

The rod assembly extends beyond the side portions of the head member such that the hub of the rod abuts the outer side of one side portion of said head member and the threaded end of the rod extends beyond the outer side of the other side portion of the head member. The rod assembly includes a lock nut which engages the threaded end of the rod for tightening the locking assembly against the locking plate and the side portions of the head member to maintain the head member in a particular vertical location along the column members.

Accordingly, the present invention provides solutions to the aforementioned problems present in planer apparatuses that cause indentations or snipes on each end of the workpiece by providing a planer apparatus that secures the head member in a particular vertical location. These and other details, objects, and advantages of the invention will become apparent as the following description of the present preferred embodiment thereof proceeds.

BRIEF DESCRIPTION OF THE DRAWINGS

In the accompanying drawings, there are shown present preferred embodiments of the invention wherein like reference numerals are employed to designate like parts and wherein:

FIG. 5 is a top view of a disassembled locking assembly of the present invention;

FIG. 5a is a side view of the locking assembly of the present invention taken along section a—a of FIG. 5;

DETAILED DESCRIPTION OF THE PREFERRED EMBODIMENTS

Figure 1:
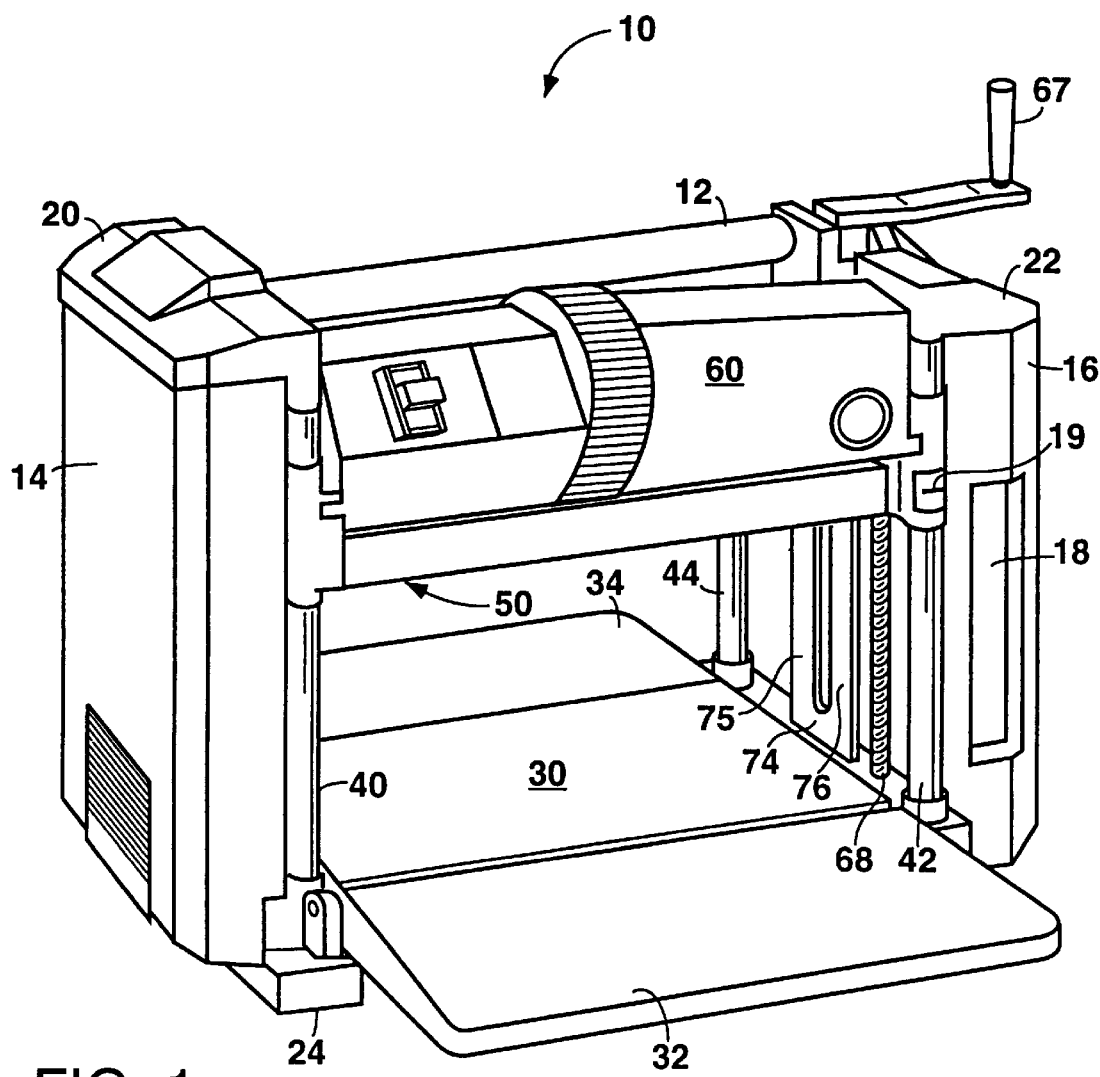
FIG. 1 is a perspective view of a preferred planer apparatus of the present invention.

Referring to the drawings for the purpose of illustrating the present preferred embodiments of the invention only and not for purposes of limiting the same, the Figures show a planer apparatus, generally designated as 10. While the planer apparatus is well-adapted to be a portable apparatus, those skilled in the art will appreciate that the subject planer apparatus 10 can be constructed as a "permanent" fixture for planing purposes. Accordingly, the subject invention should not be limited to use solely as a portable planer apparatus.

Figure 2:
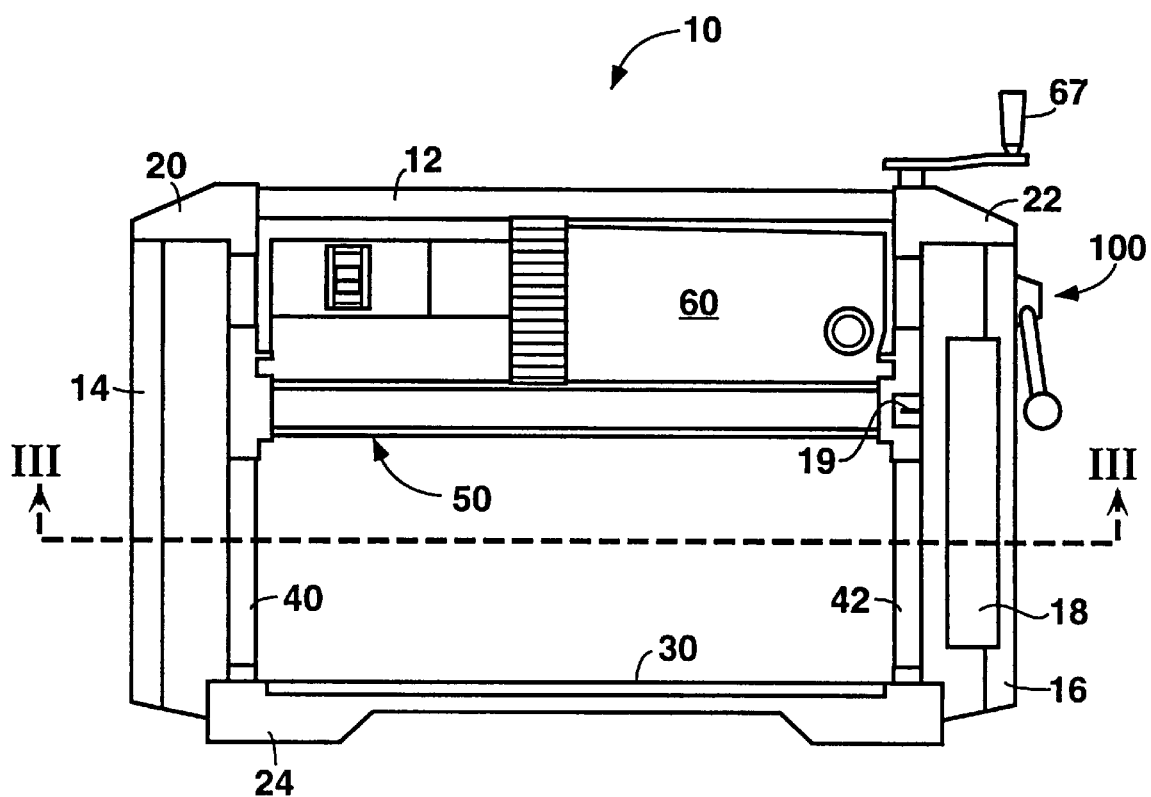
FIG. 2 is a front elevational view of a preferred planer apparatus of the present invention.

Referring more particularly to FIGS. 1 and 2, there is shown a planer apparatus 10 that includes a frame, including top frame members 20 and 22 and a base 24, a table 30 mounted on the base 24 for supporting a workpiece, and a handle 12 mounted between the top frame members 20 and 22, for carrying and transporting the planer apparatus 10. Side guards 14 and 16, mounted between the top frame members 20, 22 and the base 20 24, enclose the movable drive systems of the planer apparatus 10. In a preferred embodiment, the frame members 20, 22 and the base 24 are made from aluminum. The base 24 is substantially rectangular in shape and supports four column members 40, 42, 44, and 46. See FIG. 3. In particular, the columns 40, 42, 44, and 46 are preferably mounted between the top frame members 20 and 22 and the base 24 at or near each corner of the base and the corresponding corner of the top frame members 20 and 22. The columns 40, 42, 44, and 46 are preferably made from corrosion resistant steel and slidably engage a head 50, in which a cutterhead 80 is rotatably mounted. As will be described in further detail below, when rotated, the cutterhead uniformly removes small amounts of wood from a workpiece as the workpiece is passed through the planer apparatus 10. A motor 60, mounted on the head 50, rotates the cutterhead, as well as the infeed and outfeed rollers 90 and 92, which are used to help support and move the workpiece through the planer apparatus 10.

The height of the head 50 relative to the table 30, and thus the height of the cutterhead 80, is adjusted by the height adjusting spindles 66 and 68. See FIG. 3. The height adjusting spindles 66 and 68 are mounted between the top frame members 20, 22 and the base 24 and are in threaded engagement with the head 50. The height adjusting spindles 66 and 68 are rotated by rotating a crank 67 and the rotation of the spindles is translated to axial movement of the head 50. Thus, depending upon which direction the crank is rotated, the head is moved axially either upwards, towards the top frame portions 20, 22, or downwards, towards the table 30. The position of the head 50 relative to the table 30 determines how much wood from the workpiece is removed by the planer apparatus 10 in a particular pass of the workpiece through the apparatus 10. A locking assembly 100 mounted within head 50 maintains the head 50 in the desired vertical position relative to the table 30. In particular, head locking plates 70 and 74 are attached to the base 24 and extend to the top frame members 20 and 22. See FIGS. 4 and 7. The locking plates 70, 74 are preferably made from steel, are U-shaped, and include forks 71, 72 and 75, 76, respectively. The locking assembly 100 presses the head 50 against the forks 71, 72 and 75, 76 of the locking plates 70 and 74, respectively, to retain the head 50 in a desired position, as will be discussed further below.

Figure 3:
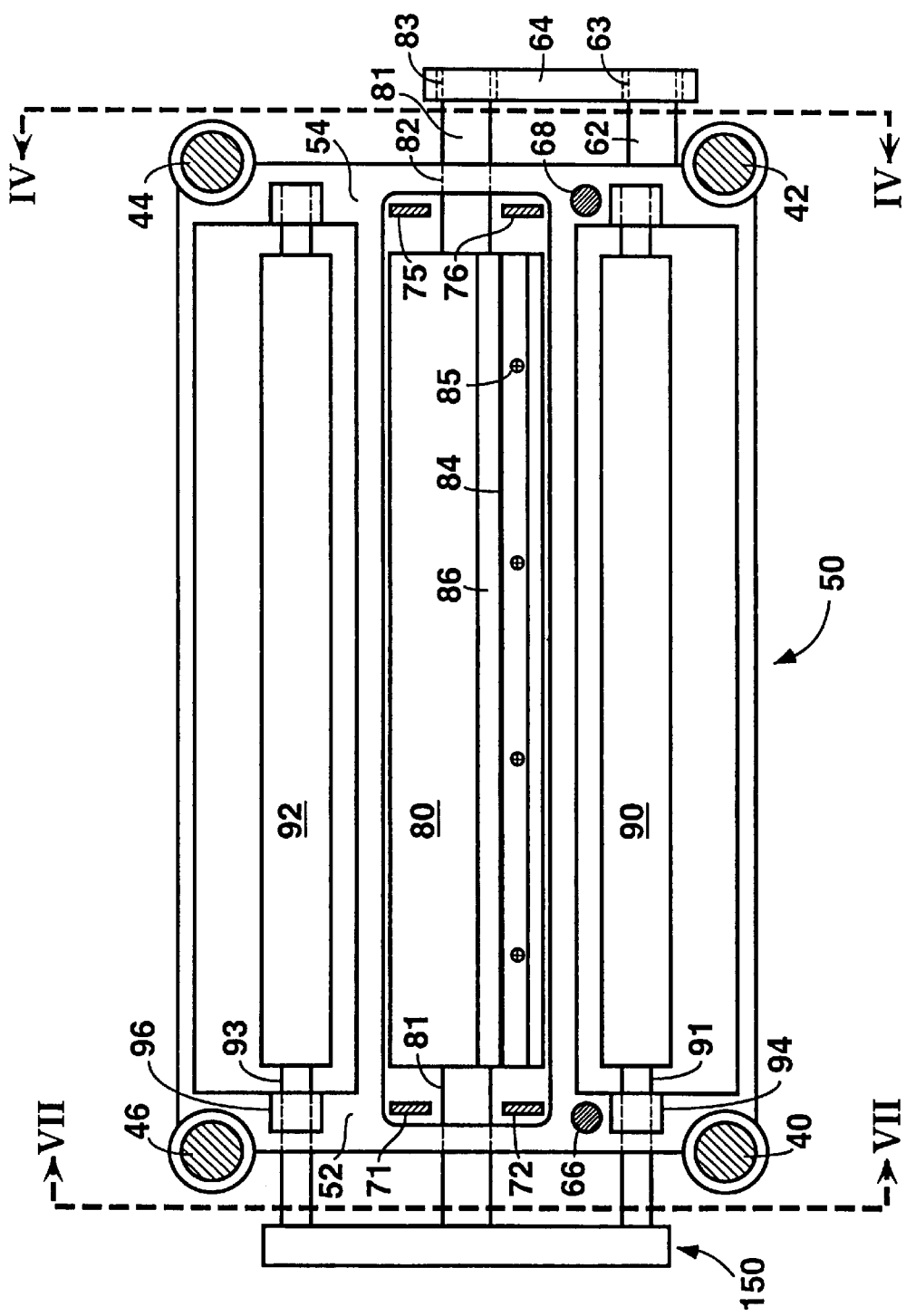
FIG. 3 is an enlarged partial cross-sectional view of a preferred planer apparatus taken along section III—III of FIG. 2.
Figure 4:
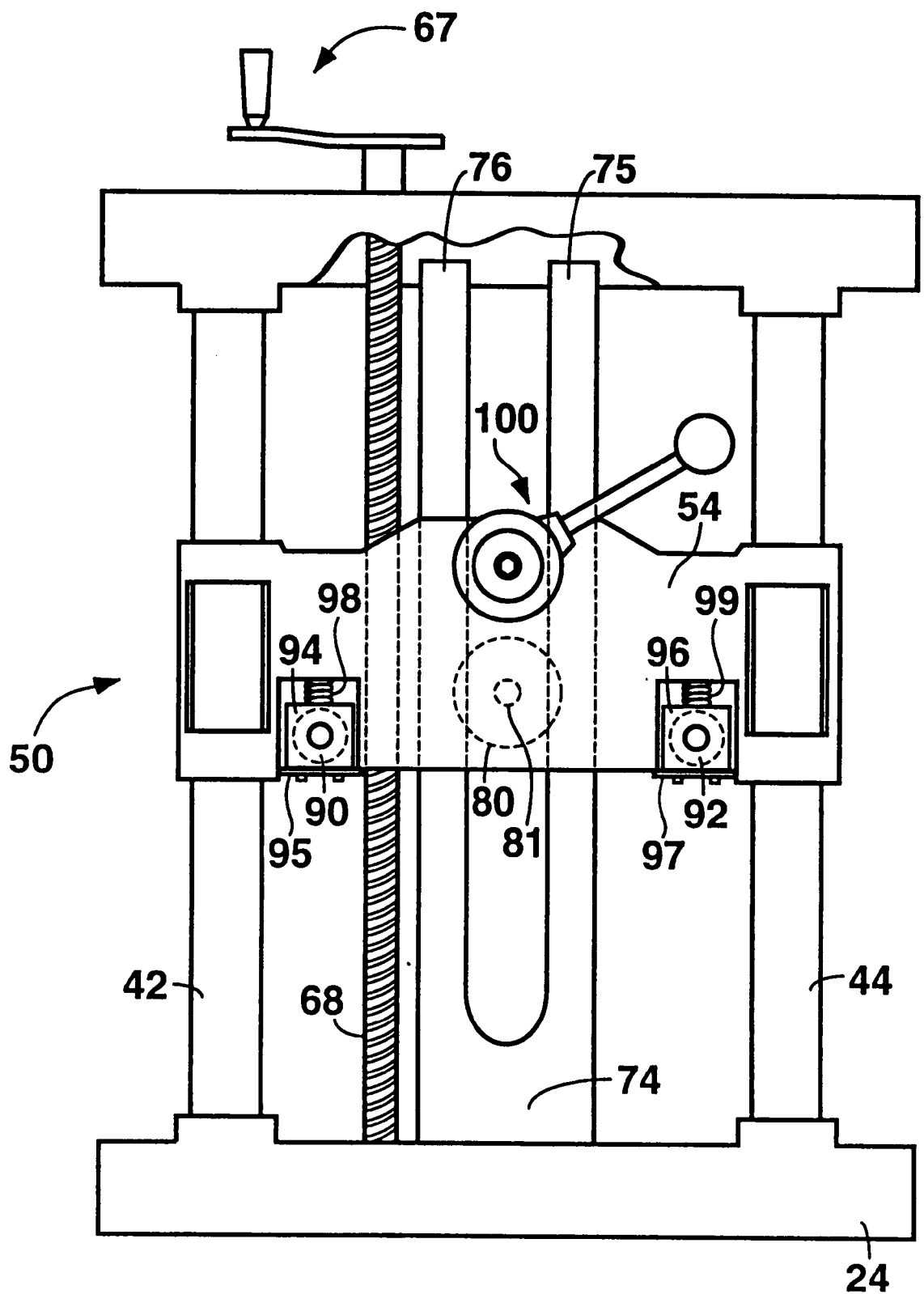
FIG. 4 is a partial side view of a preferred planer apparatus taken along section IV—IV of FIG. 3.
Figure 7:
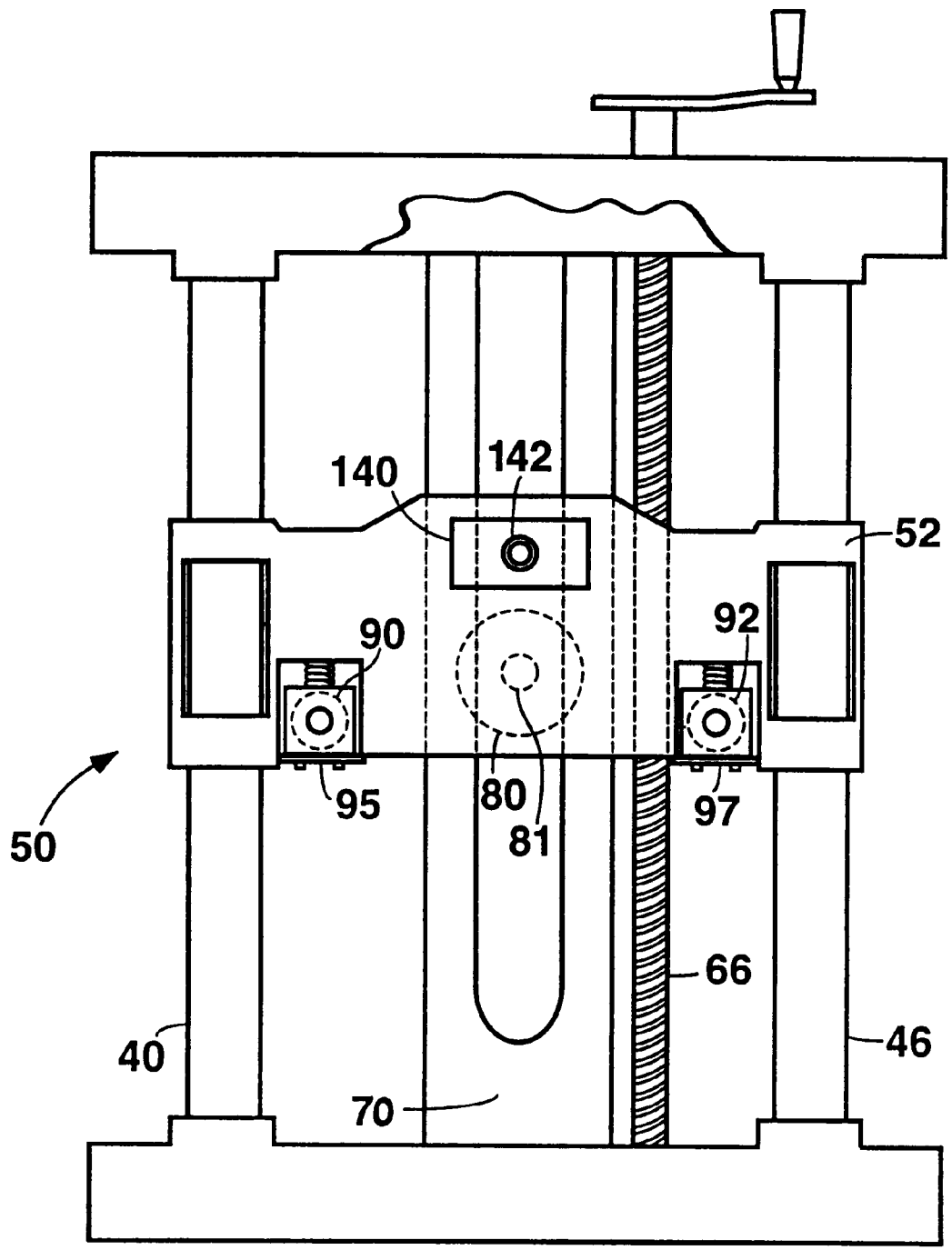
FIG. 7 is a partial side view of a preferred planer apparatus taken along section VII—VII of FIG. 3.

Referring as well to FIG. 3, a bottom view of the head 50 is shown slidably engaged on column members 40, 42, 44, and 46. The head 50 is preferably made from aluminum casting and includes side portions 52 and 54. The cutterhead 80 is rotatably mounted within the side portions 52 and 54 of head 50. An infeed roller 90 and an outfeed roller 92 are rotatably mounted within the side portions 52 and 54 of the head 50 on either side of the cutterhead 80. Referring as well to FIGS. 4 and 7, the axle 81 of the cutterhead 80 extends between the forks 71, 72 and 75, 76 of the locking plates 70 and 74, respectively. The locking assembly 100 is preferably positioned above the cutterhead 80 and also extends between the forks 71, 72 and 75, 76 of the locking plates 70 and 74 and straddles the side portions 52 and 54 of the head 50 to retain the head 50 in a vertical position.

Referring more particularly to FIG. 5, the locking assembly 100 includes a rod assembly 110 and a locking bar assembly 120, the rod assembly 110 being received within the locking bar assembly 120. The rod assembly includes a rod 112 threaded on one end 114 and having a hub 116, preferably having a hexagonal shape, on the other end. An actuator lever 118, including a knob 119, is preferably threadably attached to the hub 116.

As shown in FIG. 5, the locking bar assembly 120 includes head lock shoes 122 and 124, a hollow cylindrical tube 126, and spacers 130 and 132. The head lock shoes 122 and 124 include cylindrical portions 121 and 123, respectively. The tube 126 preferably includes one end 125 that is machined to have a smaller outer diameter than the outer diameter D1 of the tube 126. The end 125 fits within the spacer 130 and the cylindrical portion 121 of the head lock shoe 122 such that an edge 128 of the tube 126 abuts the spacer 130. The other end 127 of the tube 126 is internally threaded to receive spacer 132. In particular, the spacer 132 includes a hollow jack screw 134 and a lock nut 138. One end 133 of the jack screw 134 is threaded and corresponds with the threads on the inside end 127 of the tube 126 and the other end 135 of the jack screw 134 comprises a cylindrical surface which is sized to fit within the cylindrical portion 123 of the head lock shoe 124. The jack screw 134 also includes a hexagonal surface 136 to facilitate the turning thereof by, for example, a wrench. Thus, the lock nut 138 is threaded onto the jack screw 134 and end 133 of the jack screw 134 is then threaded into the end 127 of the tube 126. The position of the jack screw 134 within the threaded end 127 of the tube 126 is secured when the lock nut 138 is tightened against the edge 129 of the tube 126. The other end 135 of the jack screw 134 is inserted within the cylindrical portion 123 of shoe 124. Each component, the shoes 122, 124, including cylindrical portions 121, 123, the tube 126, and the spacers 130, 132, including the jack screw 134 and the lock nut 138, each include a bore to define a coaxial passage extending through the locking bar assembly 120 for receiving the rod assembly 110. The jack screw 134 enables the overall length of the locking bar assembly 120 to be adjusted to compensate for variances in manufacturing dimensions, as will be explained in further detail below. Alternatively, the end 127 of the tube 126 and the spacer 132 may have the same design as the tube end 125 and the spacer 130. In this embodiment, the length of the locking bar assembly 120 cannot be adjusted. However, in either embodiment, the tube 126 is in secured engagement with the head lock shoes 122 and 124. This arrangement of the locking bar assembly 120 ensures that when the locking assembly 100 is tightened, the vertical position of the head 50 relative to the table 30 is maintained without causing alignment problems through over-tightening the locking assembly 100, as will be discussed in further detail below.

Figure 6:
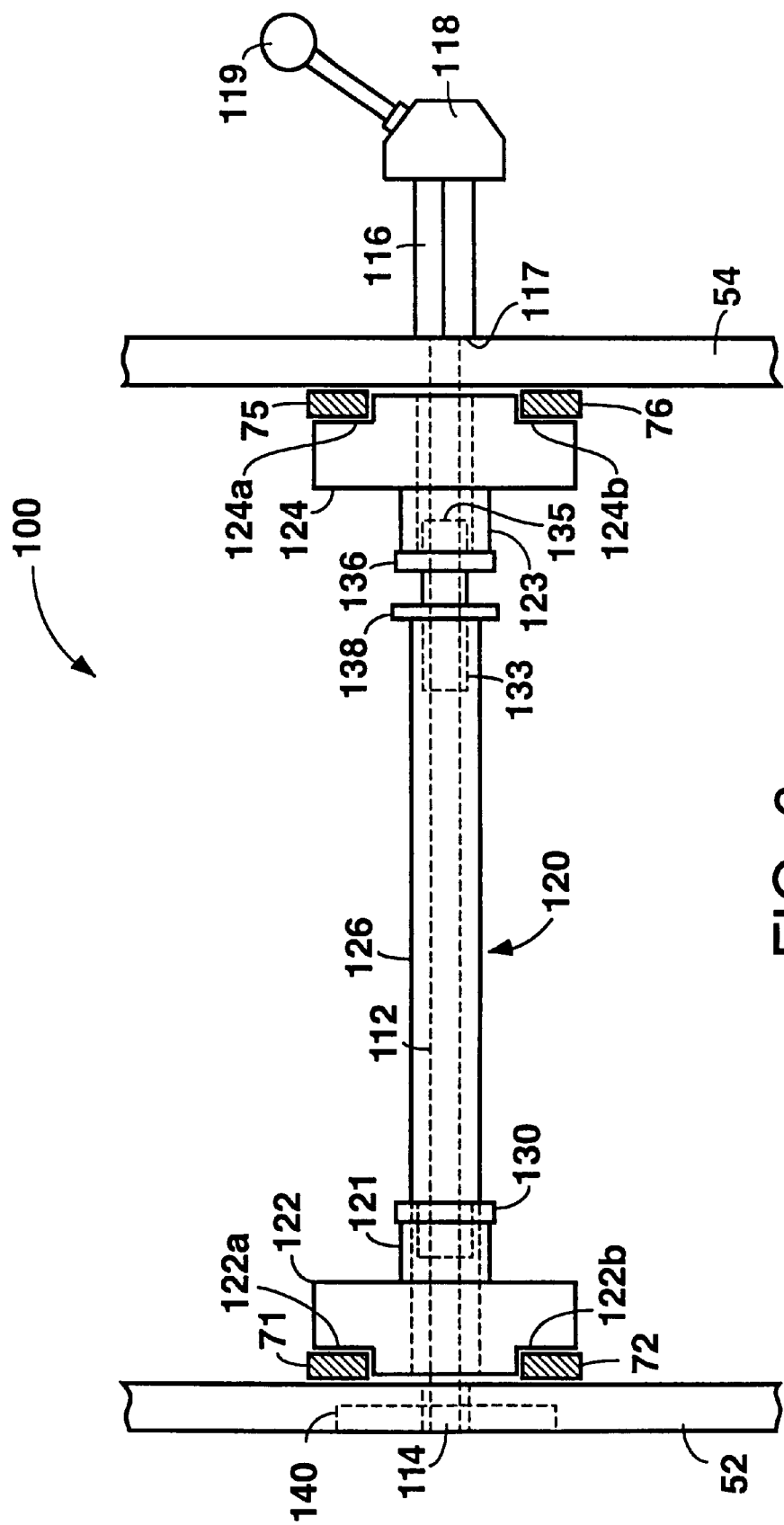
FIG. 6 is a top view of the locking assembly inserted within the planer apparatus.

Referring as well to FIG. 5a, the head lock shoes 122 and 124 are preferably made from aluminum casting and are substantially rectangular in shape. Each shoe 122, 124 includes indentations 122a, 122b and 124a, 124b, respectively, on each side of the shoe. These indentations correspond in both size and shape to the forks 71, 72 and 75, 76 of the locking plates 70 and 74. Referring more particularly to FIG. 6, the locking assembly 100 is received between the side portions 52 and 54 of the head 50 such that the locking bar assembly 120 is located between the locking plates 70 and 74. Specifically, the indentations 122a, 122b and 124a, 124b of the head lock shoes 122 and 124 fit securely against the forks 71, 72 and 75, 76 of the locking plates 70 and 74 and the forks 71, 72 and 75, 76 abut the side portions 52 and 54 of the head 50. In the preferred embodiment, to establish a "snug" fit with the forks 71, 72 and 75, 76 of the locking plates 70, 74, the jack screw 134 is rotated within tube 126 to either expand or contract the locking bar assembly 120. As used herein, "snug" means that the indentations 122a, 122b and 124a, 124b are in contact with, and exert a slight force against, the forks 71, 72 and 75, 76 of the locking plates 70 and 74. When the desired fit is obtained between the shoes 122, 124 and the forks 71, 72 and 75, 76, the lock nut 138 is secured against the edge 129 of the tube 126 to lock the jack screw 134 in position. After the locking bar assembly 120 has been installed in the above-described manner, the threaded end 114 of the rod assembly 110 is inserted through the side portion 54 of head 50, into the locking bar assembly 120, and through the side portion 52 of the head 50. Referring as well to FIG. 7, a lock nut 140, having a threaded bore 142, is positioned adjacent to the side portion 52 of the head 50. The threaded bore 142 receives the threaded end 114 of the rod 112. In a preferred embodiment, the lock nut 140 is rectangular in shape; however, any shape is suitable so long as the lock nut is sufficiently large to engage the side portion 52 of the head 50 and to distribute the forces to 5 tighten the locking assembly 100. To tighten the locking assembly 100, a user rotates the lever 118 which turns the rod 112. The rod 112 rotates within the locking bar assembly 120 and the end 114, in threaded engagement within bore 142, rotates within the lock nut 140. Thus, the locking assembly 100 is either tightened or loosened depending upon whether the lever 118 is rotated clockwise or counter-clockwise. When the locking assembly 100 is tightened, the end 117 of the hub 116 presses against the side portion 54 of the head 50 and the lock nut 140 is pulled into the side portion 52 of the head 50. This results in the shoes 122 and 124 being firmly clamped against the forks 71, 72 and 75, 76 of the locking plates 70 and 74 and the forks 71, 72 and 75, 76 being firmly clamped against the side portions 52 and 54 of the head 50. This arrangement of the locking bar assembly 120, i.e., the 20 length of the tube 126 and the engagement of the tube 126 within spacers 130, 132 enables the locking assembly 100 to maintain the head 50 in a particular vertical position relative to the table 30 while preventing the locking assembly 100 from being over-tightened which could result in deformation of the planer apparatus 10. The maintenance of the vertical position of the head 50 relative to the table 30 while the planer is in use prevents the workpiece from being marred with indentations or snipes on each end of the workpiece.

In a preferred embodiment, the cutterhead 80 is rotatably mounted within the side portions 52 and 54 of the head 50, i.e., the axle 81 of the cutterhead 80 is rotatably mounted within conventional bearings 82 mounted in the head 50. The cutterhead 80 includes at least two knives 84 mounted in a flute 86 formed in the cutterhead 80. The knives 84 are preferably secured using lock screws 85. When the cutterhead is rotated, the knives 84 remove small amounts of wood from the workpiece to plane the workpiece to a desired thickness.

The infeed roller 90 and the outfeed roller 92 are also rotated to help grip and guide the workpiece into and out of the planer apparatus 10. In the preferred embodiment, the infeed and outfeed rollers 90, 92 are coated with neoprene, or a similar like material, which is capable of gripping and guiding the workpiece, yet is malleable to prevent damage to the finished workpiece surface. The axles 91 and 93 of the infeed roller 90 and the outfeed roller 92 are rotatably mounted in bearings 94 and 96, respectively. The bearings 94 and 96, which are preferably conventional bearing blocks, are mounted in the head 50 and are held in place using bearing block mounting plates 95 and 97, which are screwed into the head 50. The bearings 94 and 96 are preferably spring mounted to head 50 by springs 98 and 99 which are placed between the bearings 94 and 96 and the head 50. See FIGS. 4 and 7. The infeed and outfeed rollers are spring mounted to enable the rollers to adjust to the uneven surface of a workpiece. However, as noted previously, as the workpiece is fed into the planer apparatus 10 and is supported only by the spring mounted infeed roller, there is a tendency for the end of the workpiece to be thrust up against the cutterhead 80. Similarly, as the workpiece exits the planer apparatus 10, and is secured only by the spring mounted outfeed roller, there is a tendency for the exit end of the workpiece to be thrust up against the cutterhead 80. If the cutterhead 80 is not secured, it can move when the workpiece is thrust against it, resulting in the indentations or snipes being formed into each end of the workpiece. Notably, the threaded spindles 66 and 68, onto which the head 50 is threadably mounted, typically have some play between the threads. Thus, the spindles are generally not sufficient to retain the head 50 in a particular vertical position relative to the table 30. However, when the locking assembly 100 is tightened, it secures the head 50, and thus the cutterhead 80, against the locking plates 70, 74 such that substantially no vertical movement of the cutterhead 80 occurs when the workpiece is thrust against the cutterhead 80 as the workpiece enters and exits the planer apparatus 10. Thus, the locking assembly 100 reduces the amount of damage caused to each end of the workpiece due to sniping, resulting in a significant cost savings as each end of the workpiece no longer needs to be discarded because it's damaged.

The height of the cutterhead 80 in relation to the table 30, via vertical movement of the head 50, determines the amount of wood that is removed from the workpiece. A scale 18 is preferably located on the side guard 16 to show the exact position of head 50, and thus the cutterhead 80, in relation to table 30. In particular, the head preferably includes a pointer 19 which indicates the position of the cutterhead 80 on the scale 18 in relation to table 30. The position of the cutterhead 80 relative to the scale 18 determines the amount of wood that is to be removed from the workpiece with each pass of the workpiece through the planer apparatus 10. As previously discussed, rotation of the height adjusting spindles 66 and 68 cause the head 50 to move axially along the columns 40, 42, 44, and 46. In particular, the crank 67 rotates the spindle 68. The spindle 68 is rotatably connected to spindle 66 by a sprocket and chain arrangement known in the art. Thus, rotation of spindle 68, using the crank 67, simultaneously causes the rotation of spindle 66 such that each side of the head 50 is axially translated equally and thus remains level to ensure even planning of the workpiece. In a preferred embodiment, spindles 66 and 68 are provided with acme threads. The skilled artisan will appreciate that acme threads are more suited for raising and lowering an apparatus, i.e., such as the head 50, and can withstand high loads. The spindle threads are preferably designed such that one rotation of the crank 67 translates to a specified axial distance traveled by the head 50. Thus, preliminary adjustments of the cutterhead 80 height can be made by rotating the crank 67 through a specified rotation.

Referring to FIG. 3, the cutterhead 80 is operably coupled to the motor 60. In particular, a belt 64 is operably supported on a drive pulley 83 (which is mounted onto the axle 81 of cutterhead 80) and a drive pulley 63 (which is mounted on a shaft 62 of motor 60) to operably couple the cutterhead 80 to the motor 60. Additionally, the infeed roller 90 and the outfeed roller 92 are operably coupled to the cutterhead 80 in a known manner. In particular, a gear reduction box 150, including a plurality of gears mounted to the axles 81, 91, and 93 of the cutterhead, the infeed roller, and the outfeed roller, respectively, are engaged with gear chains to translate the rotation of the cutterhead 80, which is rotated by the motor 60, into rotation of the infeed and outfeed rollers 90, 92. As is known in the art, the speed (revolutions per minute) of the infeed and the outfeed rollers 90, 92 is reduced by the gear box 150. Thus, the motor serves to rotate the shaft 62 and drive the belt 64 to rotate the cutterhead 80. Rotation of the cutterhead 80 causes the gears and gear chains within gear box 150 to rotate, resulting in rotation of the infeed and outfeed rollers 90 and 92 at the desired speed. Those of ordinary skill in the art will appreciate that other drive/gear arrangements could be successfully employed.

Referring to FIGS. 1 and 2, the table 30 is formed by attaching a wear plate, preferably made from stainless steel, to the base 24. This wear plate facilitates the workpiece being easily guided across the table. Additionally, the table 30 includes a front table 32 and a back table 34 that each abut opposite sides of the main table 30. The front table 32 and the back table 34 include height adjusting screws (not shown) which are mounted to the bottom frame portion 24 of the planer apparatus 10 to ensure that the workpiece is supported by a substantially even, level surface as it is fed into the planer. The base 24 also preferably has a criss-cross pattern of ribs formed within it. This rib structure adds rigidity to the base and thus reduces the amount of deformation of the table 30. This reduction in table deformation also helps to reducing sniping because deflection of the table tends to cause the workpiece to be unevenly cut by the cutterhead 80.

As can be gleaned from the above description, the subject invention represents a vast improvement over prior planing apparatuses. In particular, the subject invention significantly reduces material damage resulting from sniping and chatter of the cutterhead during planing. Such novel attributes serve to greatly reduce the amount of damaged material that typically must be discarding after planing. The subject invention is also capable of being constructed in a manner that facilitates its portability, thus making it an ideal choice for the home wood-working shop. The skilled artisan will appreciate that various changes in the details, materials, and arrangements of the components which have herein been described and illustrated in order to explain the nature of the invention may be made by those skilled in the art within the principal and scope of the invention as expressed in the appended claims.

What is claimed is:

1. A planing apparatus for reducing a thickness of a material, the apparatus comprising:
    a frame assembly having a first and second side;
    a support surface attached to said frame assembly for supporting the material thereon;
    a head member comprising a cutterhead, said head member supported by said first and second sides of said frame assembly and being selectively positionable at a desired elevation relative to said support surface; and
    a locking assembly mounted on said head member for selectively simultaneously engaging said first and second sides of said frame assembly to lock said head member at said desired elevation.

2. The planing apparatus recited in claim 1 wherein said frame assembly comprises first and second column members and said head member slidingly engages and is selectively positionable on said column members.

3. The planing apparatus recited in claim 2 wherein said first side of said frame assembly comprises said first column and wherein said second side of said frame assembly comprises said second column.

4. The planing apparatus recited in claim 2 wherein said frame assembly comprises four columns, said head member slidingly engaging each of said four columns, said first side of said frame assembly comprising two of said four columns and said second side of said frame assembly comprising the remaining two of said four columns.

5. The planing apparatus recited in claim 3 wherein said frame assembly further comprises a top portion and a bottom portion, said head member being selectively positionable between said top portion and said bottom portion.

6. The planing apparatus recited in claim 5 wherein said frame assembly further comprises two locking plates mounted to said bottom portion and extending to said top portion of said frame assembly, one said locking plate disposed on each said first side and second side of said frame assembly, said locking assembly selectively simultaneously engaging both said locking plates to lock said head member at said desired elevation.

7. The planing apparatus recited in claim 6 wherein each said locking plate comprises two forks.

8. The planing apparatus recited in claim 7 wherein shoe portions of said locking assembly abut said forks of each said locking plate, and wherein said shoe portions of said locking assembly may selectively simultaneously engage said forks of said locking plates to lock said head member at said desired elevation.

9. The planing apparatus recited in claim 8 wherein said locking assembly comprises a rod assembly and a locking bar assembly.

10. The planing apparatus recited in claim 9 wherein each said locking plate comprises an inner surface and an outer surface, and wherein said locking bar assembly comprises first and second ends and wherein each said first and second end comprises a shoe that abuts an inner surface of said forks of a said locking plate, said shoes selectively simultaneously forcefully contacting said forks of said locking plates to lock said head member at said desired elevation.

11. The planing apparatus of claim 10 wherein said locking bar assembly further comprises a tube extending between and coupled to said shoes.

12. The planing apparatus recited in claim 11 further comprising at least two spacers, one said spacer coupling each said shoe to said tube of said locking bar assembly.

13. The planing apparatus recited in claim 12 wherein a first end of said tube is internally threaded and said spacer mounted between a said shoe and said first end of said tube includes a screw and a lock nut, said screw comprising threads corresponding to said threads of said first end of said tube such that when said screw is threaded within said first end of said tube a distance between said shoes can be extended such that said shoes forcefully contact said forks of said locking plate for locking said head member at said desired elevation.

14. The planing apparatus recited in claim 13 wherein said head member includes at least two clamping blocks, one said clamping block disposed adjacent said outer surface of each said locking plate, and wherein simultaneously each said locking plate may be clamped between a said clamping block and one said shoe portion of said locking assembly so as to lock said head member at said desired elevation.

* * * * *

UNITED STATES PATENT AND TRADEMARK OFFICE
CERTIFICATE OF CORRECTION

PATENT NO.    : 5,957,173
DATED         : September, 28, 1999
INVENTOR(S)   : Garcia Page 1 of 1

It is certified that error appears in the above-identified patent and that said Letters Patent is hereby corrected as shown below:

Please amend the Title page of the subject patent to include the following information.

-- Related U.S. Application Data

Continuation of Serial No. 08/694, 945, filed August 9, 1996, now Patent No. 5,794,675.--

Signed and Sealed this

Fourth Day of September, 2001

Attest:

*Nicholas P. Godici*

*Attesting Officer*

NICHOLAS P. GODICI
*Acting Director of the United States Patent and Trademark Office*